United States Patent [19]

Warner

[11] Patent Number: 4,860,857

[45] Date of Patent: Aug. 29, 1989

[54] PISTONLESS AIR POWERED LUBRICATING SYSTEM

[75] Inventor: Dale J. Warner, Palm Harbor, Fla.

[73] Assignee: Gits Manufacturing Company, Creston, Iowa

[21] Appl. No.: 212,289

[22] Filed: Jun. 27, 1988

[51] Int. Cl.$^4$ .......................... F16N 13/22; F04F 1/06
[52] U.S. Cl. ...................................... 184/7.4; 417/137
[58] Field of Search .......................... 184/7.4, 54, 55.1; 417/137, 141, 142, 139

[56] References Cited

U.S. PATENT DOCUMENTS

| | | | |
|---|---|---|---|
| 2,048,323 | 7/1936 | Cutts | 184/7.4 |
| 2,498,407 | 2/1950 | Fine | 184/7.4 |
| 2,516,427 | 7/1950 | Schweisthal | 184/7.4 |
| 3,075,615 | 1/1963 | Thomas | 184/7.4 |
| 3,647,319 | 3/1972 | McLean et al. | 184/14.3 |

Primary Examiner—Leonard E. Smith
Assistant Examiner—D. Scheuermann

[57] ABSTRACT

A cyclic lubrication system is pulled by compressed air by way of a timer so that an injector manifold, having a plurality of injector valves, is fed with a lubricant which is gravity fed into the system during the off times of the cyclic air pulsation. Each of the injector valves is adjustable with respect to the quantity of lubricant delivered.

3 Claims, 2 Drawing Sheets

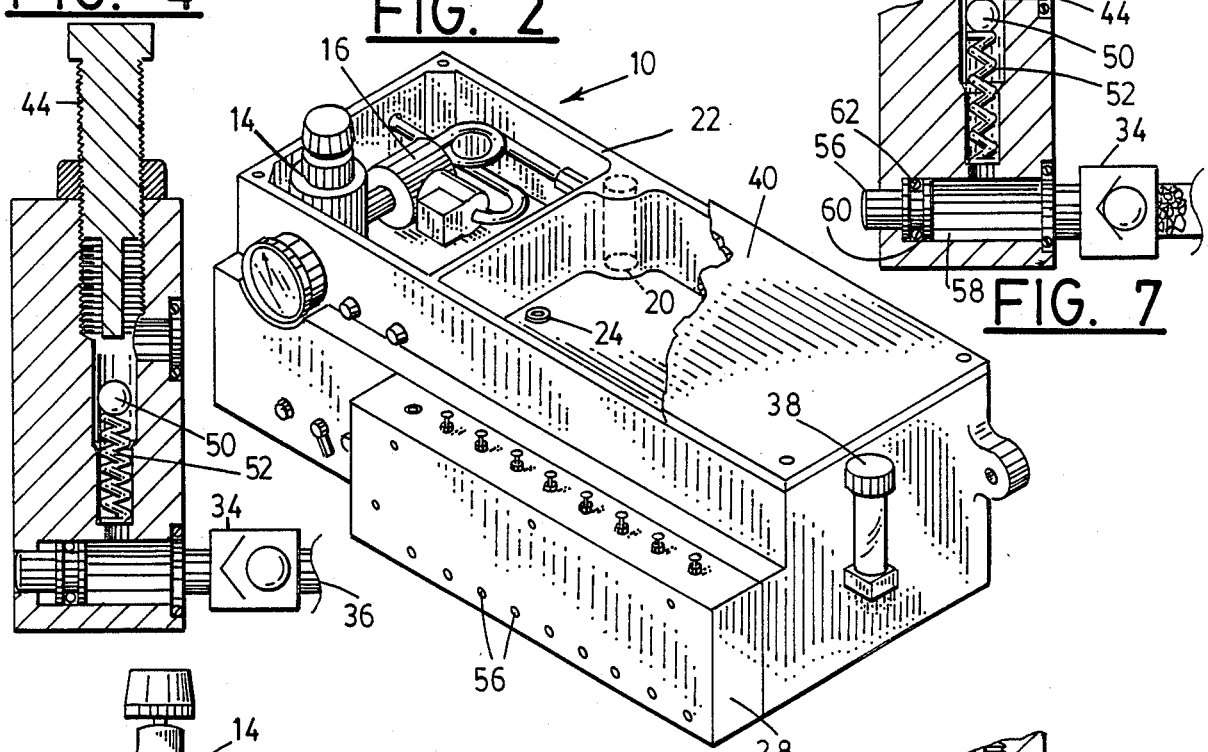
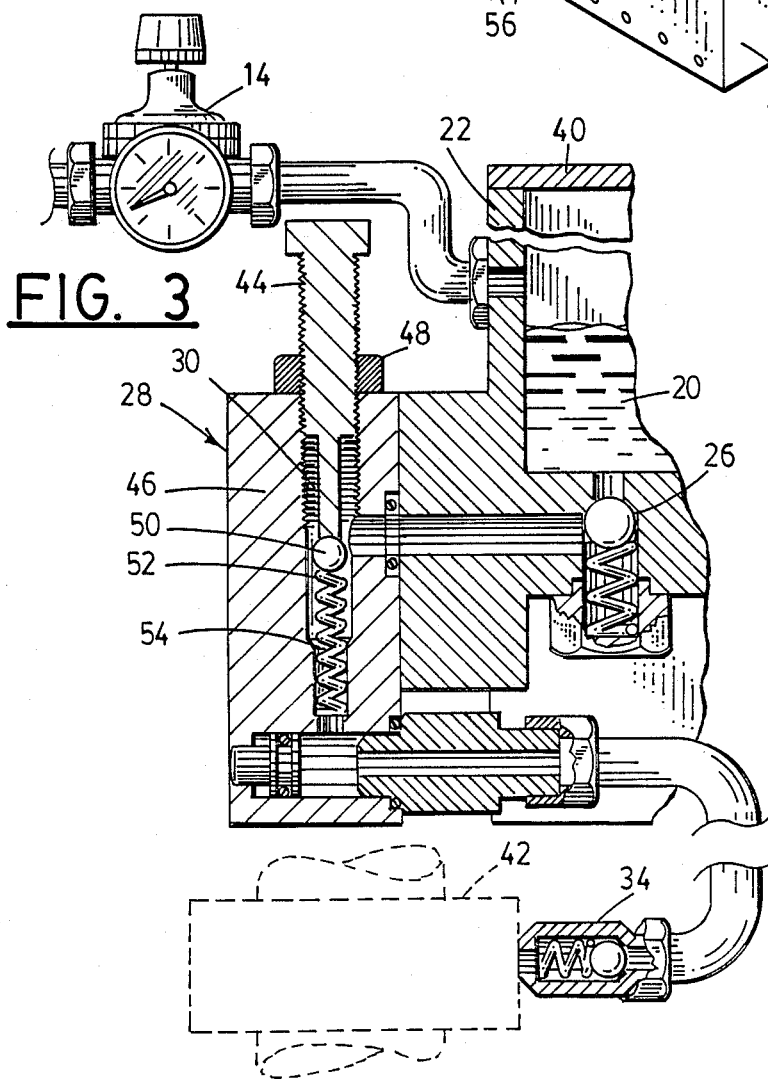
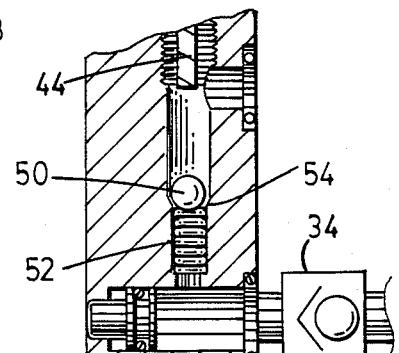
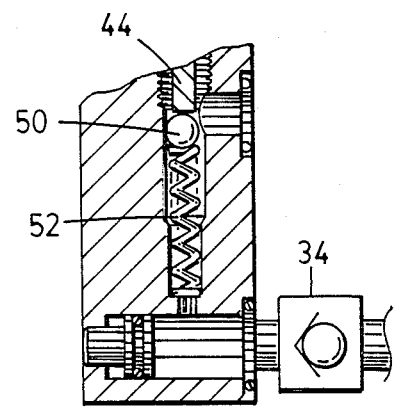

PISTONLESS AIR POWERED LUBRICATING SYSTEM

BACKGROUND OF THE INVENTION

1. Field of the Invention

The present invention relates to a cyclic lubrication system for a plurality of machine parts, such as bearings, and more particularly to a simple, inexpensive lubricating system which delivers controlled quantities of lubricant in a cyclic manner, and which system is adjustable with respect to cycle and with respect to lubricant volume.

2. Description of the Prior Art

It is well known in the art, particularly by plant managers, that exact quantities of lubricant should be provided at exact intervals. When incorrect lubrication occurs it can cause machine performance to be impaired, such as burn-out of bearings, and eventually leads to expensive downtime.

One recognizes the problem associated with unreliable lubricating devices and, heretofore, the answers to these problems have not been easily provided. It is true that much has been said about central lubrication systems which are automatically activated, some of which are even electronically activated. However, with every system there are a host of problems ranging from over complication to over sophistication. This means that there are too many components which require a team of experts to custom design or too delicate electronic components to perform in a shop atmosphere.

SUMMARY OF THE INVENTION

It is the object of the present invention to provide a sensible solution to most of the problems associated with central lubrication. This is accomplished with a new, innovated approach which is simple, yet effective.

Central lubrication systems offered by a variety of companies are extremely complicated. In most cases, one if forced to chose from the type of system one thinks he needs (resistance type of positive displacement type). Then one must chose the type of unit (cyclic, continuous, discharge on pressure rise or discharge on pressure drop) and choose manual or powered operation. if powered, one must choose between relatively simple automatic units or more complicated electronic units. Once all of these decisions are made, one needs to choose from a wide variety of fittings, valves, injectors and regulators.

Once all of these choices have been made, one is faced with the problems of installation that can be very time consuming and frustrating. While it is true that most manufacturers use a team of installation experts who can be scheduled to come to your plant to place your unit on stream, it is very involved and expensive.

One does not need the time, expertise and expense to supply most of the equipment with an automatic controlled lubrication system. The system of the present invention can be installed in minutes and the components are pre-installed, except delivery lines and machine-end fittings.

For the majority of automatic, controlled lubrication applications one does not need an exotic, expensive lubrication system. One needs a reliable, simple to install unit which delivers an exact prescribed amount of lubricant when and where it needed. One needs an automatic lubrication system which is compact, pre-engineered and packaged complete for most appplications, easily installed and simple to operate.

The system of the present invention provides positive injection which operates by applying pressure to one side of an injector ball to the other side so that no wearing occurs. It provides adjustable volumetric flow by displacement (metered positive displacement) and expensive "blocked line" indicator is not required as an accessory in that it is provided within the system.

Using clean, dry compressed air found in most machine areas, air is directed through a regulator and reduced to a recommended 20-25 psi before it enters an air-over-oil chamber position in an oil reservoir. Air entering the chamber is time-activated to provide oil from the reservoir to an injector block. There are, for example, 9 injectors located in a common injector block and are designed to operate independently to provide specific amounts of oil to lubrication points. When the solid state electronic timer is set, all injectors may operate, when needed; however, the exact amount of oil delivered by the injectors can be varied.

The timer has maximum of, for example, 20 cycles per hour. The maximum amount of oil delivered to one point is, for example, 7 drops per cycle; the minimum amount of oil delivered to one point is 1 drop per cycle.

In order to determine the drop rate, each flow of 360° turn of the injector screw represents one drop of oil (for example 0.5 mL). Seven full turns of the injector screws are all that is possble in this example, Each time the injector is activated, a spring-guided ball (located in the injector) forces the prescribed amount of oil to the lubrication point at 20-25 psi, and the system provides lubricant to a maximum of, for example, 50 feet (combination of all 9 injectors).

The present lubrication system is an innovative system in which the design overcomes typical problems of competitive units which use restrictions for balance. Restrictive type units are troubled with lubrication viscosity and temperature change. They may also be susceptible to plugged systems and hoses due to dirt and wax build up. To assure the blockage does not occur one is forced to provide an accessory indicator which adds to the cost of the basic unit.

The present system features a new method to achieve positive injection metered displacement without the usual problems. It is designed to perform in ISO viscosity grades ranging from 15-320 CST (centistrokes).

BRIEF DESCRIPTION OF THE DRAWINGS

Other objects, features and advantages of the invention, its organization, construction and operation will be best understood from the following detailed description, taken in conjunction with the accompanying drawings on which:

FIG. 2 is a perspective view of a lubrication system constructed in accordance with the present invention, shown partially broken away, and illustrating specific components of the invention;

FIG. 3 is a sectional view of a portion of FIG. 2 showing a portion of the reservoir, the regulator, the manifold and the delivery to a bearing;

FIGS. 4, 5 and 6 illustrate different stages of operation of the injector valves of the invention, namely stage I in which the outlet valve is opened and the ball of the injector valve is receiving oil therearound and being forced down, stage II in which the ball of the injector valve has been forced down and the outlet valve is still open, and stage III in which the pressure is relieved and the outlet valve is closed so that the ball of the injector valve is moved up away from its valve seat; and FIG. 7 which illustrates a blockage condition and in which a blockage indicator is activated.

DESCRIPTION OF THE PREFERRED EMBODIMENTS

Figure 1:
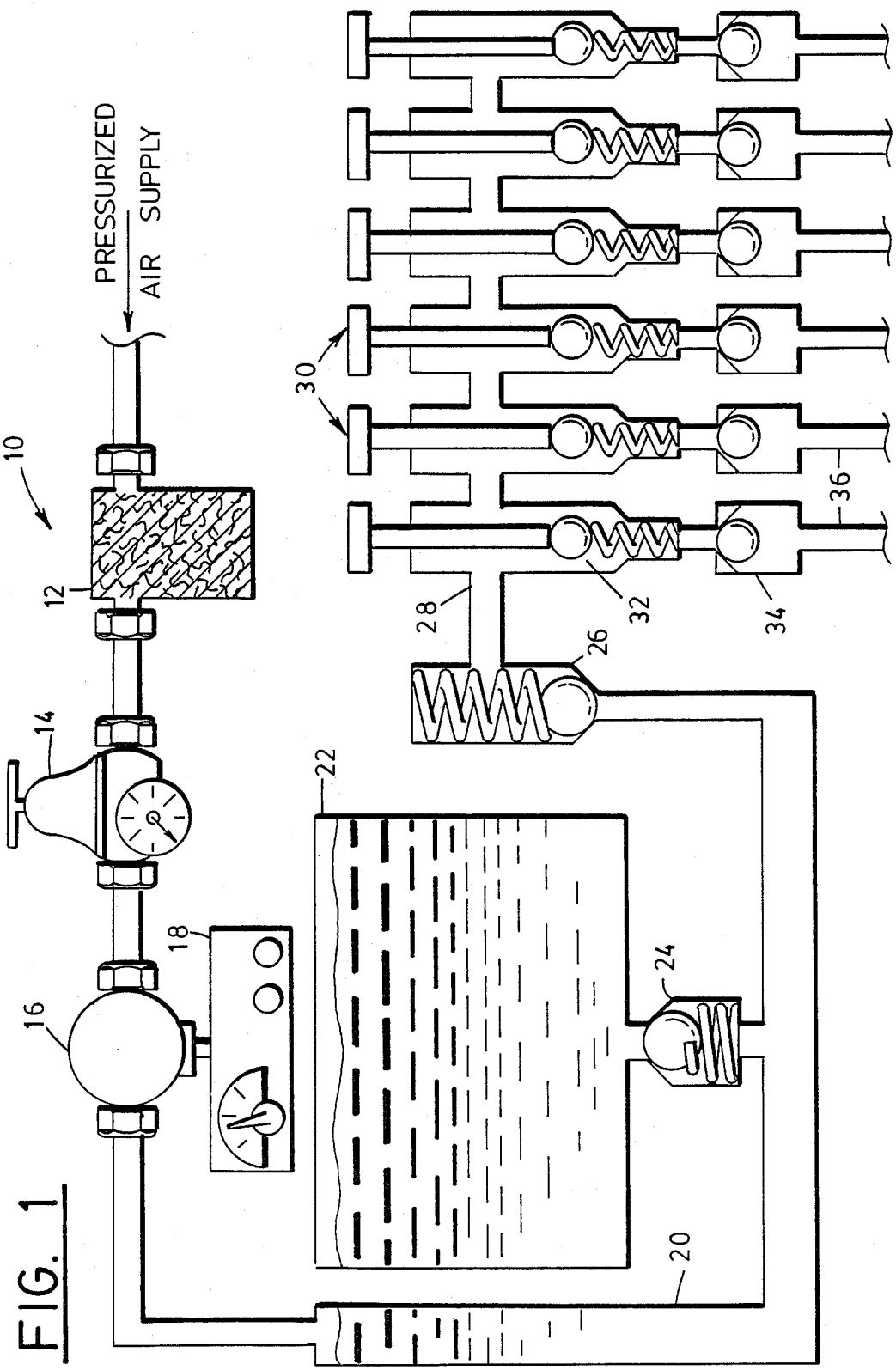
FIG. 1 is a schematic illustration of a lubrication system constructed in accordance with the present invention.

Referring to FIG. 1, a cyclic lubrication system is illustrated at 10 as coprising an air filter 12 for receiving a pressurized air supply and feeding the same to an adjustable regulator 14 for a solenoid valve 16 which is operated, cyclically, by an adjustable timer 18. The valve 16 feeds a lubricant chamber 20 which is connected to a manifold 28 by way of a manifold check valve 26.

A reservoir 22 holds the lubricating fluid which may pass through a check valve 24 in an off-pressure time filling the lubricant chamber 20.

The manifold 28 feeds a plurality of injectors 30, which are also adjustable, for controlling a plurality of valves 32 to feed lubricant through a plurality of check valvs 34 to respective outlets 36 for lubricating bearings and the like.

Referring to FIG. 2, the lubrication system is generally illustrated at 10 as comprising, without the air filter, an adjustable pressure regulator 14, a solenoid 16, a reservoir 22 with a level indicator 38, a cover 40, an manifold in the form of an injector block 28 and a plurality of injectors each including a blockage indicator 56.

Referring to FIG. 3, the reservoir or tank 22 is illustrated with the cover 40 containing a lubricant. The lubricant chamber 20 is gravity fed under the weight of the lubricant in the reservoir 22 by way of the valve 24. The lubricant is forced through the valve 26 into the injector block or manifold 28 to an injector 30. The injector 30 includes a threaded adjustment screw 44 which is threadingly received in the valve member 46 by way of a seal 48 to adjust the height of the ball 50 and therefore the amount or volume of lubricant. The ball 50 is urged against the lower end of the adjustment screw 44 by way of a spring 52 and away from a valve seat 54. As pressure is applied, lubricant injected into the manifold forces the ball 50 down against the force of the spring 52 so that the lubricant below the ball 50 is expelled to open the valve 34 and lubricate the bearing 42.

FIG. 4 shows stage I. In this stage, the outlet valve 34 is open, the ball 50 is forced down and the oil beneath the ball 50 is pumped to the bearing 42.

In FIG. 5, the valve 34 is open in stage II and the ball 50 is force down and seated against the valve seat 54. In this stage oil does not move to the bearing 42.

FIG. 6 illustrates stage III in which the cycle has operated to relieve pressure, the valve 34 is closed and the ball 50 has been moved away from the valve seat 54 by way of the spring 52.

The system cycles in these three stages. If, however, there is a bearing blockage with respect to lubrication, the valve 34 closes, as seen in FIG. 7, and the pressure during stage I builds up in a passageway 58 to force out an indicator 56 which is mounted on a member which includes a groove 60 having an O-ring 62 mounted in the passageway 58 because the ball 50 is up against the adjustment screw 44, there is no flow through the valve 34 and the pressure buildup in passageway 58 forces out the indicator 56.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A cyclic lubrication system, comprising:
   a solenoid connected to a pressurized air supply and an adjustable timer connected to and cyclically operating said solenoid in an on-off cycle;
   an injector manifold including a lubricant input, a plurality of lubricant outputs, a plurality of injector valves connected to said lubricant input, and the plurality of output check valves each connected to a respective injector valve and serving as a respective lubricant output of said injector manifold;
   a reservoir holding a lubricant;
   a lubricant chamber connected to receive lubricant from said resevoir and connected between said solenoid and said injector manifold to be presurized and deliver lubricant to said manifold during the on portion of the cycle;
   a reservoir check valve connecting said reservoir to said lubricant chamber and operable to open in response to the weight of the lubricant inthe reservoir during the off portion of the cycle to gravity feed lubricant to said lubricant chamber; and
   a manifold check valve connecting said lubricant chamber to said lubricant input of said manifold and operable to open during the on portion of the cycle and closed during the off portion of the cycle and wherein
   said reservoir check valve comprises a passageway including a valve seat and a ball in said passageway; and
   a spring urging said ball towards said resevoir during the off portion of the cycle.

2. The cyclic lubrication system of claim 1, wherein:
   each of said injectors comprises:
   a passage;
   a spring in said passage;
   a valve seat in said passage;
   a ball in said passage bearing against said spring and being forced away from said valve seat; and
   a threaded screw at one end of said passage opposite said spring for engaging said ball and adjusting the amount of lubricant delivered.

3. The cyclic lubrication system of claim 2, wherein each of said injector valves comprises:
   another passage into the fluid communication with the first-mentioned passage;
   a piston slidably mounted in said other passsage and including a peripheral groove, and an O-ring mounted in said peripheral groove and sealing said piston to the interior of said other passge; and
   an indicia on said piston and extending through said other passage to the exterior of said injector block in response to a blockage and pressure build up in said passage and said other passage.

* * * * *